Dec. 29, 1964 R. W. KOLODGY ETAL 3,163,065
APPARATUS FOR AUTOMATICALLY ADJUSTING THE
STOP OF A HOT-METAL CUTTING MACHINE
Filed June 30, 1961 2 Sheets-Sheet 1

INVENTORS
ROBERT W. KOLODGY
WILLIAM L. ROBERTS
BY Donald G. Dalton
ATTORNEY

United States Patent Office 3,163,065
Patented Dec. 29, 1964

3,163,065
APPARATUS FOR AUTOMATICALLY ADJUSTING THE STOP OF A HOT-METAL CUTTING MACHINE
Robert W. Kolodgy, Pittsburgh, and William L. Roberts, Murrysville, Pa., assignors to United States Steel Corporation, a corporation of New Jersey
Filed June 30, 1961, Ser. No. 121,426
2 Claims. (Cl. 83—72)

The present invention relates generally to hot metal cutting and more particularly to apparatus for automatically adjusting the bumper position of a hot-metal cutting machine stop.

Because of economies that can be realized by cutting metals at high temperatures, it is common commercial practice to cut such products as structural-steel beams, plates and slabs when they are at elevated temperatures. This cutting may be performed by metal-cutting saws or crop shears, or by similar devices, used in conjunction with equipment such as a movable stop that permits the cut length of the hot metal to be accurately predetermined.

Most of the pieces of metal that are cut at elevated temperatures are used at ambient temperatures where their dimensions, especially the length, must conform to certain specifications. Typical examples are structural-steel beams which, when cold, must have lengths within certain well-defined tolerance limits. Since it is well known that metal contracts on cooling, it is common practice to saw the hot beams into sections or lengths longer than the desired length when cold to compensate for the shrinkage that takes place as the metal cools.

Prior to our invention the practice of hot-sawing metal was based on the assumption that the hot metal was sawn at a well-defined temperature and that the shrinkage in length was related solely to the hot-sawn length for similar pieces of hot metal. For structural-steel beams, saw cuts are made over a wide range of temperatures because of the cooling of a given piece of material during the sawing period, the non-uniform temperatures of the steel slabs in the soaking pits, the different rolling conditions, the nonuniformity in the temperatures of the beams, etc. It is obvious, therefore, that if a constant allowance is made for the shrinkage under these conditions, the cold lengths will not conform to desired specifications.

It is, accordingly, the primary object of our invention to provide apparatus for automatically adjusting the bumper position of a hot-metal cutting machine stop whereby the bumper-positioning motor of the stop is actuated automatically in accordance with the temperature of the metal being cut.

It is another object of our invention to provide apparatus of the character described which includes a temperature-sensing element and a self-balancing electrical system for applying voltage to the bumper-positioning motor in accordance with the output of the temperature-sensing element.

As a corollary to the object immediately above, it is a further object of our invention to provide apparatus of the character described wherein a self-balancing potentiometer having nonlinear characteristics is utilized in the electrical system.

These and other objects will become more apparent after referring to the following specification and attached drawings in which.

Although the apparatus of the invention is herein described in connection with the hot-sawing of structural-steel beams, it will be understood that the invention is not restricted to the cutting of any one type of metal, nor to the cutting of any particular shape of metal. Moreover, although the apparatus of the invention is shown and described in conjunction with hot-sawing equipment, it will be obvious that the apparatus of the invention can be used equally effectively in conjunction with other types of equipment for cutting metals, such as shears, etc.

It is believed that the detailed description of the invention will be more readily understood if preceded by the following general description of the apparatus and the functions performed thereby.

Figure 2:
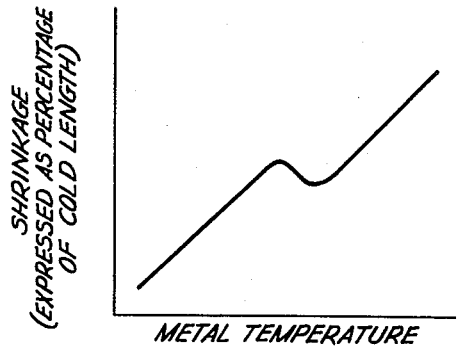
FIGURE 2 is a curve illustrating the general shrinkage characteristics of a typical steel beam relative to metal temperature.
Figure 3:
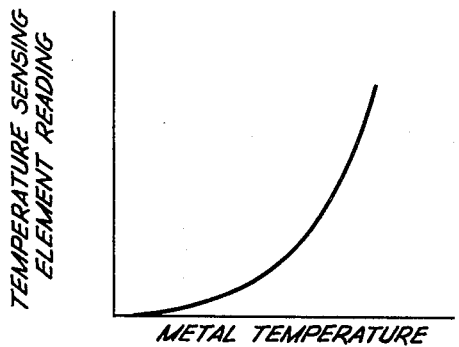
FIGURE 3 is a curve illustrating the nonlinear characteristics of the temperature-sensing element readings in relation to metal temperature.

The basic function of the apparatus of the invention is to accept an electrical signal from a temperature-sensing element, establish the allowance that must be made for thermal shrinkage, and then provide this allowance in the form of an electrical signal to the fine adjustment means of a hot-metal cutting machine stop. In order for the apparatus of the invention to function as intended, it must be supplied with information relating to the desired cold length and any other factor influencing shrinkage. In order that description of the apparatus of the invention not be unduly complex, it has been assumed that the temperature of the beam to be cut is uniform throughout its cross section and that it cools slowly, maintaining the condition to a substantial degree. Under these circumstances, beam shape has been assumed to have no influence on the shrinkage. Further, it has been assumed that the beams are of the same composition and that all exhibit shrinkage characteristic curves such as the one illustrated in FIGURE 2. In FIGURE 2 the temperature of the material is plotted along the X axis and the percent shrinkage along the Y axis, the abnormality in the curve being due to metallurgical transformation in the steel. However, the output signal of the temperature-sensing element is not linear to temperature of the beam. This relationship is shown by the curve in FIGURE 3. Consequently, the shrinkage of a beam is related to the output signal of the temperature-sensing element in a manner illustrated by FIGURE 4, and the operation of the apparatus of the invention is based on this relationship.

Figure 4:
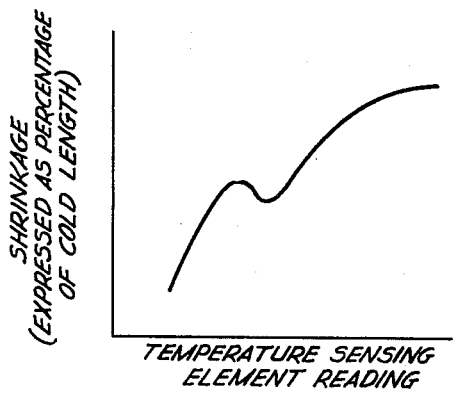
FIGURE 4 is a curve illustrating the general shrinkage characteristics of a typical steel beam relative to the temperature-sensing element readings.

The basic components of the apparatus of our invention are a reversible motor coupled to a double-gaged potentiometer and driven by a differential amplifier. One of the potentiometers is of a linear type with a D.-C. potential applied across it. It produces a potential on its slider bearing a linear relationship to motor shaft position. The other potentiometer is of the nonlinear type and wired into the circuit of the invention in such a manner that if the motor shaft position is assumed to bear a linear relationship to the output of the temperature-sensing element, the potential developed at the slider of the nonlinear potentiometer is related to the motor shaft position as the shrinkage is to the output signal of the temperature-sensing element, as shown in FIGURE 4. The slider of the nonlinear potentiometer develops a D.-C. potential proportional to the computed shrinkage.

To ensure that the signal corresponding to shrinkage bears a direct relationship to the desired cold length, the D.-C. potential applied to the nonlinear potentiometer bears a direct relationship to the desired cold length. A scaling potentiometer is provided to supply the D.-C.

voltage across the nonlinear potentiometer, and the dial of the scaling potentiometer is calibrated in terms of cold length.

In a basic conventional system, the position of a hot-metal cutting machine stop is established by a coarse and fine adjustment. The coarse adjustment is made by moving the bed of the stop with a cog-and-rack arrangement until the indicating pointer on the stop coincides with the desired cold length as read off a scale. Fine adjustment of the position, made to allow for shrinkage on cooling, is accomplished by the motion of a sliding carriage or platform on the bed. This may be carried out by the use of a screw shaft mechanically coupled to a reversible drive motor. The apparatus of our invention provides a linear potentiometer and a differential amplifier connected with the reversible drive motor. Power to the motor is supplied by the differential amplifier, which causes the motor to turn the screw shaft until a balance is reached between the potential developed by the slider of the potentiometer and the shrinkage signal developed by the nonlinear potentiometer. Since screw rotation bears a linear relationship to the shaft position of the linear potentiometer connected with the reversible drive motor shaft, it follows that displacement of the sliding carriage or platform with respect to the bed of the stop will be proportioned to the shrinkage signal produced by the nonlinear potentiometer of the apparatus.

Figure 1:
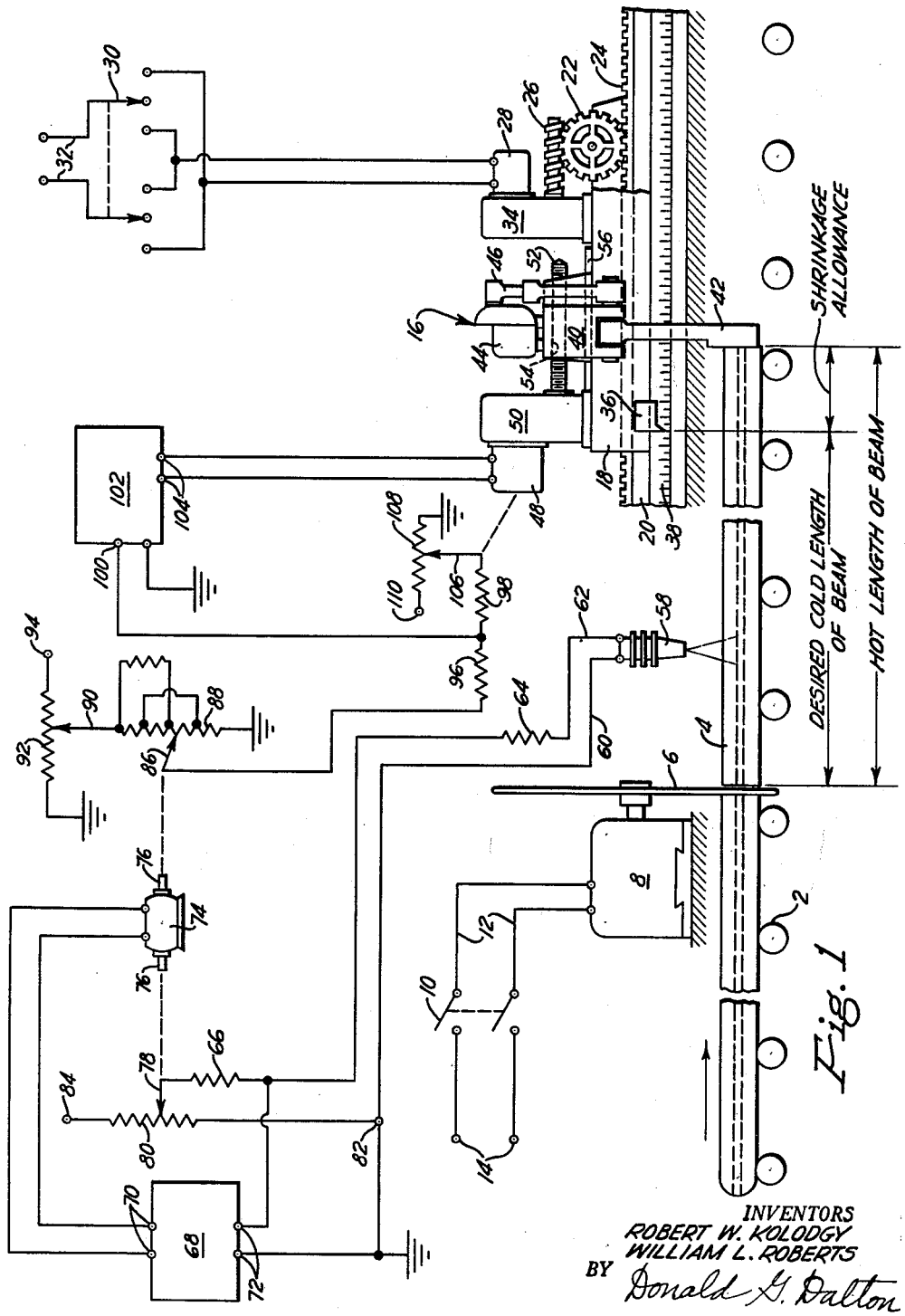
FIGURE 1 is a substantially diagrammatic view showing the apparatus of the invention incorporated into the hot-saw stop of a structural beam rolling mill.

Referring now to FIGURE 1 there is shown a driven roller-conveyor table 2 on which a structural-steel beam 4 is conducted to a hot saw 6 for cutting into predetermined lengths. The hot saw 6 is powered by a motor 8 which is actuated by a switch 10 connected in series with leads 12 to the terminals 14 of a voltage source (not shown).

A stop 16 having a body base 18 is mounted for movement along a pair of rails 20 above the roller conveyor 2. Movement of the stop 16 is effected by rotation of a rack gear 22, which is attached to the body base 18, along a rack 24, which is disposed between and parallel with the rails 20. The rack gear 22 is rotated by a worm gear 26 driven by a reversible motor 28. The motor 28 rotates the worm gear in the desired direction in response to the position of a reversing switch 30 connected in series with leads 32 to a D.-C. power source (not shown). The mechanical coupling between the worm gear 26 and motor 28 is made by a gear reducer 34.

A pointer 36 which is attached to the body base 18 extends over a graduated scale 38 disposed below rails 20. A carriage 40 is mounted for movement along the body base 18 and supports a bumper 42 which normally depends from the carriage into the path of the structural beam 4. The bumper 42 may be raised and lowered by means of a reversible motor 44 through a bell crank system 46.

The stop 16 may be positioned at the location corresponding to the required cold length of the beam 4, as shown in FIGURE 1, by the proper actuation of the reversing switch 30, which causes the stop 16 and thus the pointer 36 thereon to move along the scale 38. When the pointer indicates that the desired position has been reached, the reversing switch 30 is moved to the "off" position, as shown in FIGURE 1, to de-energize the motor 28. Fine adjustment of the bumper 42, against which the leading end of the beam 4 abuts during sawing, is effected by means of a reversible D.-C. motor 48 and gear reducer 50 which drive a screw shaft 52. The screw shaft 52 is threaded into a tapped hole 54 in the carriage 40 to which the bumper 42 is attached. Rotation of the screw shaft 52 causes the carriage 40 to move along a slider bed 56 on the body base 18.

The equipment thus far described is conventional and is not claimed as our invention, the details of which will now be described.

A temperature-sensing element in the form of an optical pyrometer 58 is disposed above the roller conveyor 2 between the hot saw 6 and the stop 16 for measuring the temperature of the beam 4 as it travels toward the bumper 42. The pyrometer 58 is a bolometer-type instrument producing an electrical signal in the form of a D.-C. potential that bears a relationship to the temperature of the area viewed by the instrument. This type of pyrometer is conventional and one model available on the market is known as "Radiamatic Head" and is manufactured by Minneapolis-Honeywell Regulator Company, Philadelphia, Pennsylvania.

The optical pyrometer 58 is positioned so as to monitor the temperature of the beam at the center of its web. We have found the web to be the preferred area for temperature measurements for the purpose of adjusting the position of the bumper 42 since the web is usually the coolest portion of the beam and since its temperature has been found to be more reliable for length control in the cutting operation.

One lead 60 at the output end of the pyrometer is connected to ground while the other lead 62 is connected with resistors 64 and 66. The junction of resistors 64 and 66, which may have the same value, is connected with a D.-C. amplifier 68 having output terminals 70. The amplifier 68 produces a signal at its output terminals proportional to and of the same polarity as the signal supplied to its input terminals 72. The output terminals 70 of the amplifier are connected with and supply voltage to a reversible D.-C. motor 74. The shaft 76 of the motor 74 is mechanically coupled to the slider 78 of a linear potentiometer 80. One terminal 82 of potentiometer 80 is connected to ground and the other terminal 84 to a source of potential (not shown) of opposite polarity to that generated by the pyrometer 58 at its output end.

The pyrometer 58, resistors 64 and 66, amplifier 68 and potentiometer 80 constitute a self-balancing, closed-loop system that will provide a rotational setting of the shaft 76 of motor 74 proportional to the output signal voltage of the pyrometer 58.

The slider 86 of a nonlinear potentiometer 88 is also connected to the shaft 76 of motor 74. Potentiometer 88 is wired between ground and the slider 90 of a scaling potentiometer 92 which is connected to a source of potential (not shown) at its terminal 94. The other terminal of potentiometer 92 is connected to ground. The slider 90 of potentiometer 92 is manually positioned according to the desired cold length of the beam 4, and thus, the potential developed at slider 90 is proportional to the cold length of the beam.

Nonlinear potentiometer 88 is designed so that the potential developed at its slider 86 is proportional to the anticipated shrinkage of the beam 4 after sawing. Nonlinear potentiometers are commercially available and may be constructed with either a non-uniformly spaced winding or a series of resistance taps. In the latter type resistors may be wired between the taps of the potentiometer to provide any desired nonlinear arrangement. Multitap potentiometers are manufactured by Beckman Instruments, Inc. and sold under the trade name "Helipots" (Helipot Catalog—1959 by Beckman Instruments, Inc.).

The slider 86 of nonlinear potentiometer 88 is coupled to one end of a resistor 96. The other end of the resistor 96 is attached to a resistor 98 and also to the input terminal 100 of a D.-C. amplifier 102. The output of amplifier 102 developed at its terminals 104 actuates the reversible motor 48 with which the amplifier 102 is connected. The slider 106 of a linear potentiometer 108 is mechanically coupled to the shaft of motor 48. Potentiometer 108 is connected by one terminal to ground and at its other terminal 110 to a voltage source (not shown) of opposite polarity to that connected to terminal 94 of scaling potentiometer 92. Potentiometers 88 and 108, resistors 96 and 98, amplifier 102 and motor 48 constitute a self-balancing, closed-loop system so that the angular position of screw shaft 52 is proportional to the voltage at the slider 86 of potentiometer 88. Hence, the position of the bumper 42 of stop 16 is proportional to the anticipated shrinkage of the beam 4.

In operation, the position of stop 16 is set by operation of the switch 30 to move the stop to the position where the pointer 36 coincides with the desired cold length as indicated on the scale 38. Switch 30 is put in "off" position to deenergize motor 28. Temperature of the beam 4 is measured by the optical pyrometer 58; this actuates motor 74 so that the slider of the nonlinear potentiometer 88 provides a voltage proportional to the anticipated shrinkage of the beam. This signal is used to provide the fine adjustment for bumper 42 of stop 16 by the action of motor 48.

To ensure that the blade of hot-saw 6 is not damaged by any motion of the stop 16 during sawing, a switch (not shown), mechanically actuated by the hot saw as it swings into cutting position, automatically disconnects drive motor 48 operating the carriage 40.

While one embodiment of our invention has been shown and described, it will become apparent that other adaptations and modifications may be made without departing from the scope of the following claims.

We claim:
1. Apparatus for cutting an elongated metal workpiece into two or more pieces of predetermined length at ambient temperature when said workpiece is at an elevated temperature which comprises a conveyor having an entrance end and an exit end adapted to move said workpiece in a lengthwise direction from said entrance end to said exit end, a hot-metal cutting saw disposed adjacent said conveyor intermediate the ends thereof, said saw being operative in the path of said workpiece to effect cutting thereof, a hot-metal cutting-machine stop disposed above said conveyor adjacent the exit end thereof, said stop having a body base mounted for movement along a trackway above and parallel with said conveyor, a carriage movable along said base, a bumper attached to said carriage and normally extending into the path of said workpiece on said coveyor, means for moving said bumper into and out of the path of said workpiece, power-actuated means for moving said carriage along said body base, a reversible motor connected with said power-actuated means for actuating the same, a temperature-sensing element disposed adjacent the path of said workpiece intermediate said saw and said stop, means connected with said temperature-sensing element for receiving an electrical signal from said element, means for modifying said signal in accordance with the anticipated percent of longitudinal shrinkage of said workpiece as it cools from elevated temperature to ambient temperature, means for developing a voltage which is a function of said shrinkage, and means for applying said voltage to said reversible motor whereby pieces having the predetermined length at ambient temperature are obtained regardless of the temperature of the workpiece at the time the cut is made.

2. Apparatus for cutting an elongated metal workpiece into two or more pieces of predetermined length at ambient temperature when said workpiece is at an elevated temperature which comprises a conveyor having an entrance end and an exit end adapted to move said workpiece in a lengthwise direction from said entrance end to said exit end, a hot-metal cutting saw disposed adjacent said conveyor intermediate the ends thereof, said saw being operative in the path of said workpiece to effect cutting thereof, a hot-metal cutting-machine stop disposed above said conveyor adjacent the exit end thereof, said stop having a body base mounted for movement along a trackway above and parallel with said conveyor, a carriage movable along said base, a bumper attached to said carriage and normally extending into the path of said workpiece on said conveyor, means for moving said bumper into and out of the path of said workpiece, power-actuated means for moving said carriage along said body base, a reversible motor connected with said power-actuated means for actuating the same, a temperature-sensing element disposed adjacent the path of said workpiece intermediate said saw and said stop, means connected with said temperature-sensing element for producing an electrical signal proportional to the temperature of said workpiece, means connected with said last-mentioned means for producing a second electrical signal proportional to the anticipated percent of longitudinal shrinkage of said workpiece as it cools from elevated temperature to ambient temperature, means for modifying said second electrical signal in accordance with the predetermined length of said workpiece at ambient temperature, and means for applying voltage to said motor in accordance with said modified second signal whereby pieces having the predetermined length at ambient temperature are obtained regardless of the temperature of the workpiece at the time the cut is made.

References Cited in the file of this patent
UNITED STATES PATENTS

| | | |
|---|---|---|
| 1,302,211 | Pflanze | Apr. 29, 1919 |
| 2,071,692 | Hill | Feb. 23, 1937 |
| 2,262,599 | Bolz | Nov. 11, 1941 |
| 2,360,995 | Whitten | Oct. 24, 1944 |
| 2,576,340 | Hammond | Nov. 27, 1951 |
| 2,989,883 | Zimsky et al. | June 27, 1961 |